Nov. 28, 1950     L. E. CONE     2,532,149
TIRE CHAIN INSTALLER AND CAR MOVER
Filed Oct. 15, 1947

Inventor
Loris E. Cone
By Clarence A. O'Brien
and Harvey B. Jackson
Attorneys

Patented Nov. 28, 1950

2,532,149

UNITED STATES PATENT OFFICE 2,532,149

TIRE CHAIN INSTALLER AND CAR MOVER

Loris E. Cone, Pullman, Wash.

Application October 15, 1947, Serial No. 779,916

7 Claims. (Cl. 254—88)

This invention appertains to novel and useful improvements in attachments adapted particularly for use in conjunction with the application of anti-skid devices to automotive vehicle wheels.

An object of this invention is to apply anti-skid devices to vehicle wheels and to assist in the removal of a vehicle from undesired anchored positions.

Another object of this invention is to provide means for carrying out the above mentioned function.

Another purpose of this invention is to provide a flexible support having means for supporting a vehicle thereon.

Another purpose of this invention is to provide a stop for use in conjunction with said vehicle support means.

A still further purpose of this invention is to provide an extremely inexpensive device of the nature described which is versatile.

Another purpose of this invention is to provide a commercially feasible and practical device for assisting in the application of anti-skid devices to vehicle wheels and for assisting in the removal of a vehicle from an icebound or snowbound position.

Ancillary objects and features of novelty will become apparent to those skilled in the art, in following the description of the preferred form of the invention, illustrated in the accompanying drawings, wherein.

Referring now in detail to the illustrated preferred form of the invention, like reference characters are used throughout to indicate similar elements.

This invention has been conceived and developed to provide a device for the purpose of assisting in removing a vehicle from a position which is considered immovable under its own power and without external assistance. Another aim of the present invention is to provide the above described device which may be utilized for the purpose of applying anti-skid chains to vehicle wheels easily and conveniently.

The simplest and most inexpensive materials of construction are to be utilized in association with the present invention, consisting primarily of inexpensive resilient material such as rubber or the like.

A flexible base 10 of some suitable material such as rubber is provided with a ramp 12 and a platform 14 rigidly secured thereto. The said ramp and the said platform are spaced leaving an aperture therebetween. The said ramp 12 has an inclined forward portion for the obvious purpose of assisting in placing the vehicle thereon. It will be noted that a portion of the base 10 extends beyond the terminal or inception of the ramp 12.

Friction conducive means is provided on the faces of the said ramp 12 and platform 14 and may be in any suitable form. The illustrated form is a plurality of ridges or protuberances 16 extending transversely of these members.

Figure 1:
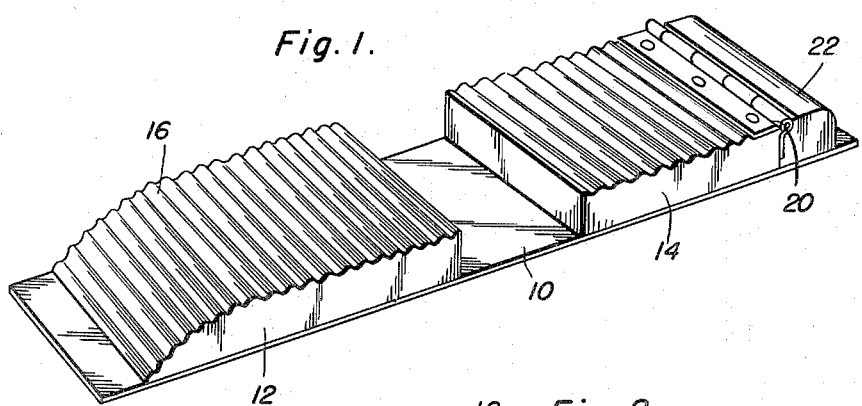
Figure 1 is a perspective view of the invention.
Figure 2:
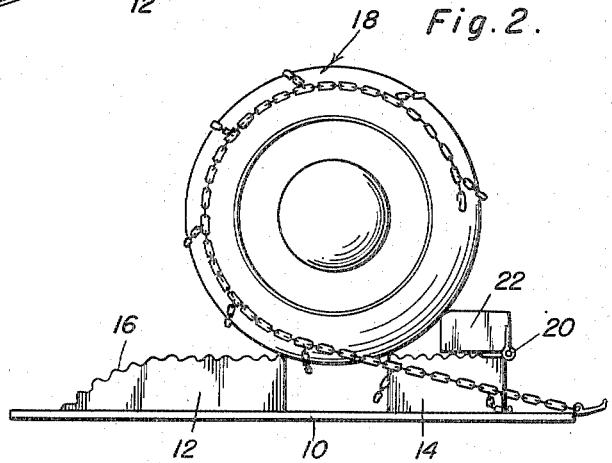
Figure 2 is the side view of the invention, showing one use of the same in conjunction with a vehicle wheel.

In operation of the invention as disclosed in Figure 2, the vehicle is simply moved to the space between the said ramp 12 and the platform 14 by its own power, an anti-skid device such as the chain 18 being first spread in the proper position on the said base and associated mechanism.

It will be noted at this point that if found desirable other types of friction conductive means may be substituted in lieu of the ridges or protuberances 16 if so desired. Also, a piano hinge 20 is provided at the forward portion of the said platform 14 and connects a stop 22 hingedly thereto. Obviously, the stop 22 is adapted to be utilized in association with the invention when being used for the purpose of applying anti-skid chains to a vehicle wheel.

Figure 3:
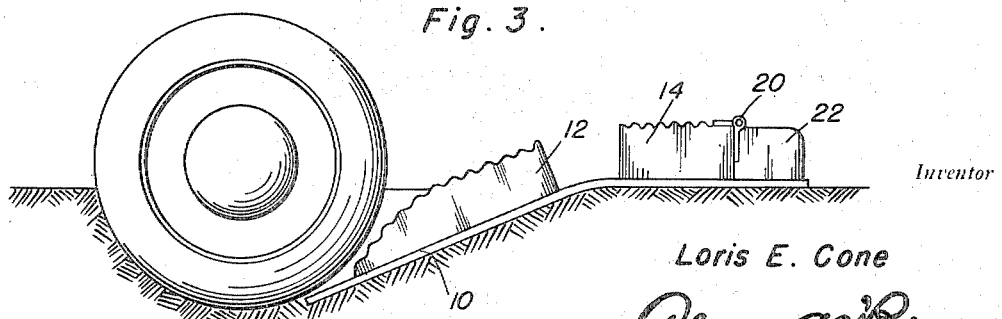
Figure 3 is an elevational side view of the invention showing a second view thereof.

Referring now to the use of the invention shown in Figure 3 it will be seen that the flexible base may be supplied on an irregular surface and the vehicle wheel driven thereon. Of course, various other uses in association with automotive vehicles may be found for the present invention. However, in removing the vehicle wheel from a position which is undesired such as from soft surfaces, from snow or ice, the present invention is easily adaptable. Due to the extreme simplicity achieved by the present invention further description thereof is deemed unnecessary. However, variations may be made without departing from the spirit of the invention.

Having described the invention, what is claimed as new is:

1. For use in the application of anti-skid chains to vehicles and to provide traction for a vehicle wheel disposed in a depressed region, a flexible support, a ramp secured to said support, a platform secured to said support and spaced from said ramp, and at least the portion of said support between said ramp and said platform being deformable to various bends and curvatures so as to be capable of conforming generally to the contour of the depressed region wherein a vehicle wheel is disposed.

2. For use in the application of anti-skid chains to vehicles and to provide traction for a vehicle wheel disposed in a depressed region, a device which includes a flexible support, a ramp secured to said support, a platform secured to said support and spaced from said ramp, friction conducive means on said ramp, means disposed adjacent said platform for limiting the travel of a vehicle wheel on said platform, and said support being deformable to various shapes to conform to the contour of the depressed region.

3. For use in the application of anti-skid chains to vehicles, a flexible support deformable to various curvatures, a ramp secured to said support, a platform secured to said support and spaced from said ramp, friction conductive means on said ramp, friction conducive means on said platform, means for limiting the travel of a vehicle wheel on said ramp and platform associated with said platform, said friction conducive means comprising protuberances, and said limiting means including a block hingedly secured to said platform.

4. An accessory for use with vehicles comprising a ramp, a platform, and a resilient member deformable to various curvatures and bends and connecting said ramp and said platform in spaced relation relative to each other.

5. An accessory for use with vehicles having wheels comprising a ramp, a platform, means deformable to various curvatures and bends for resiliently supporting said ramp and said platform in spaced relation relative to each other, and a wheel stop hingedly secured to said platform.

6. An accessory for use with vehicles having wheels comprising a ramp, a platform, means deformable to various curvatures and bends for resiliently supporting said ramp and said platform in spaced relation relative to each other, a wheel stop hingedly secured to said platform, and friction conducive means secured to said platform and said ramp.

7. An accessory for use with vehicles which have wheels, at least one of the wheels being a driving wheel comprising a ramp, a platform, a substantially flat support of material deformable to various curvatures and bends having said ramp and said platform secured thereto in spaced relation with respect to each other, a portion of said support extending beyond the opposite ends of said ramp, the part of the support extending beyond the front end of the ramp forming an entry for the driving wheel of the vehicle and said support being deformable to various contours so that it may conform generally to the contour of a recessed region having the wheel disposed therein.

LORIS E. CONE.

REFERENCES CITED

The following references are of record in the file of this patent:

UNITED STATES PATENTS

| Number | Name | Date |
|---|---|---|
| 1,189,632 | Seitz | July 4, 1916 |
| 2,022,804 | Garey | Dec. 3, 1935 |

FOREIGN PATENTS

| Number | Country | Date |
|---|---|---|
| 16,699 | Great Britain | of 1912 |